Figure 1:
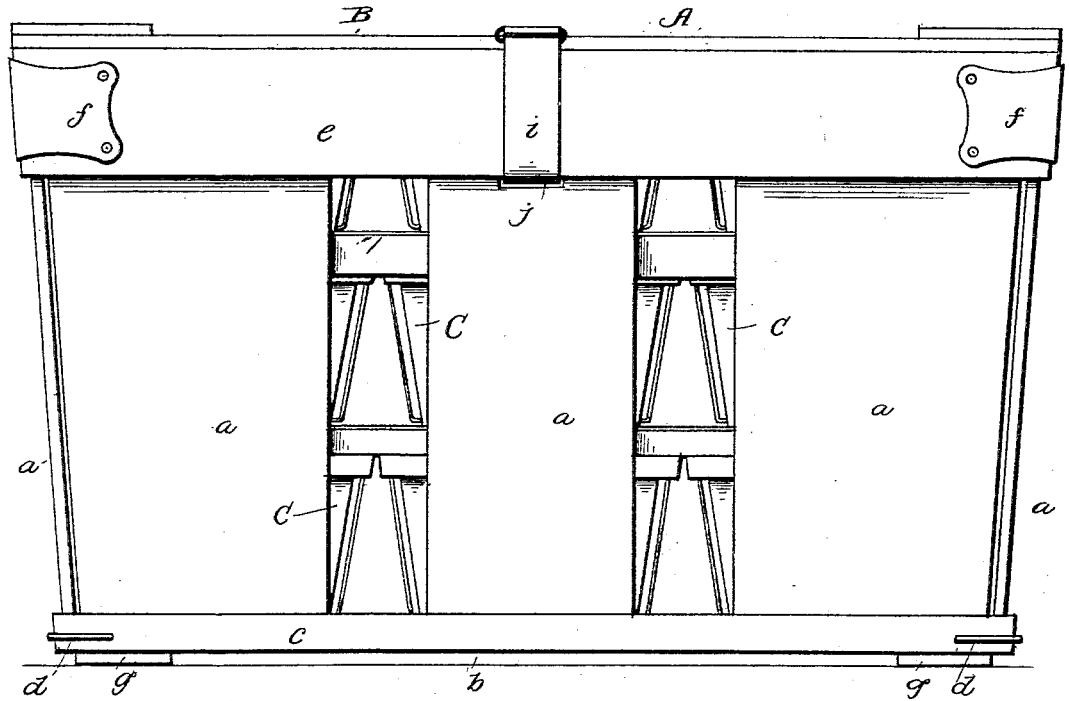

(No Model.) 2 Sheets—Sheet 1.

J. E. ROUTH.
FRUIT OR VEGETABLE CRATE OR CARRIER.

No. 504,623. Patented Sept. 5, 1893.

Witnesses.
Victor J. Evans.
W. A. Redmond

Inventor.
James E. Routh.
By J. F. Beale
Attorney.

(No Model.) 2 Sheets—Sheet 2.
J. E. ROUTH.
FRUIT OR VEGETABLE CRATE OR CARRIER.
No. 504,623. Patented Sept. 5, 1893.
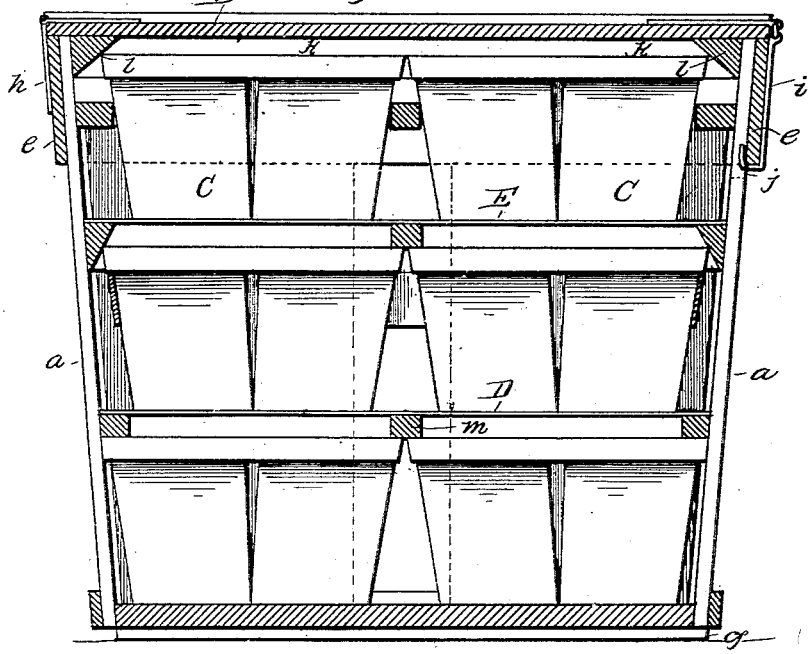
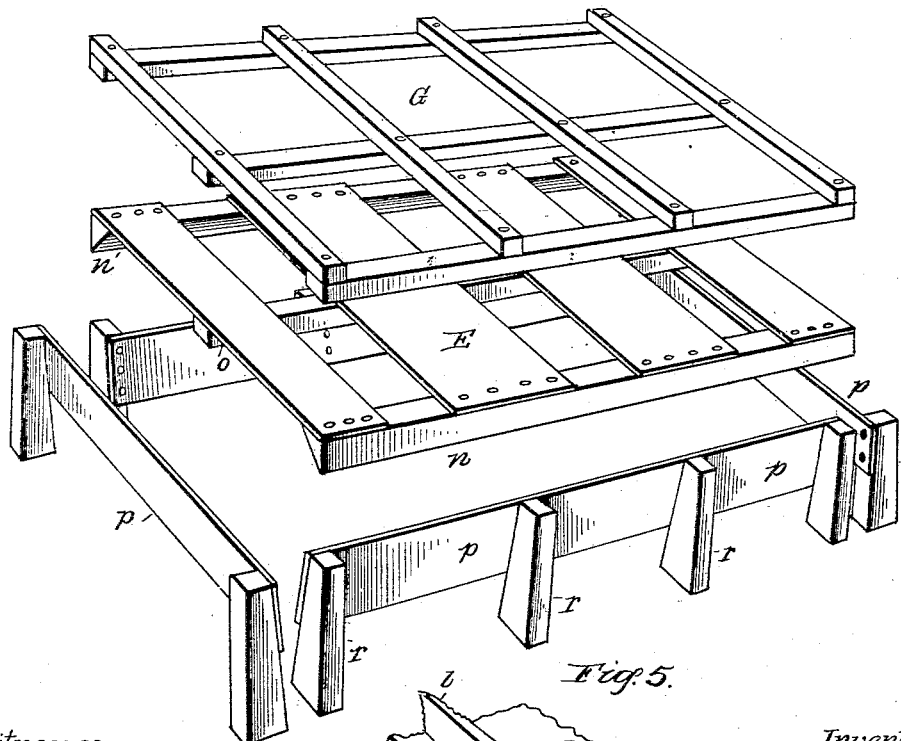
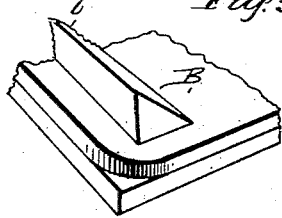
Witnesses.
Victor J. Evans.
W. A. Redmond
Inventor.
James E. Routh.
By J. F. Beale
Attorney.

UNITED STATES PATENT OFFICE.

JAMES EDWARD ROUTH, OF PETERSBURG, VIRGINIA.

FRUIT OR VEGETABLE CRATE OR CARRIER.

SPECIFICATION forming part of Letters Patent No. 504,623, dated September 5, 1893.

Application filed March 21, 1893. Serial No. 467,015. (No model.)

*To all whom it may concern:*

Be it known that I, JAMES EDWARD ROUTH, a citizen of the United States, residing at Petersburg, in the county of Dinwiddie and State of Virginia, have invented certain new and useful Improvements in Fruit or Vegetable Crates or Carriers; and I do hereby declare the following to be a full, clear, and exact description of the invention, such as will enable others skilled in the art to which it appertains to make and use the same.

This invention relates, generally, to crates or carriers for holding berry or other fruit or vegetable boxes or baskets and particularly to that class of crates or carriers in which provision is made for the access of air to all parts of the interior of the crate or carrier so that the boxes or baskets therein and the fruit or vegetables contained in such boxes or baskets may be exposed to a circulation of air at all times, and the object of this invention is to provide a simple, comparatively inexpensive, and durable crate or carrier adapted to receive and firmly hold the boxes or baskets therein in tiers separated from each other, and each of the boxes or baskets of each tier being separated from the others forming the tier and at the same time provide for ample ventilation or circulation of air between, over, and under the respective boxes or baskets forming the tiers so as to prevent overheating of the fruit or vegetables, thus enabling the shipper to get his produce to the market with the least possible deterioration in quality, and, with these objects in view, my invention consists, first, in providing a nesting crate having a cover provided with end rails adapted to bear upon and extend below the upper or top edges of the end boxes or baskets of the top tier of boxes or crates; second, in providing a pocket rack adapted to fit within a crate or carrier and to separate, and to hold firmly in their separated position, the boxes or baskets forming the tiers to prevent lateral movement thereof, and, in the event of the breaking of or injury to the separating partitions or frames on which the boxes or baskets ordinarly rest, to support said boxes or baskets against downward movement; third, in providing the tier-separating partitions or frames with side strips or rails adapted to partly rest on and to partly extend below the outer top edges of the outer boxes or baskets at each side of the crate; and fourth, in providing side and end removable bearing strips or rails adapted to closely fit the tiers of boxes or baskets at a point between the tops and bottoms of the same and thus brace and strengthen the same without impeding the circulation of air, and, finally, in other details of construction and arrangement of parts as hereinafter more fully described and claimed.

Figure 2:
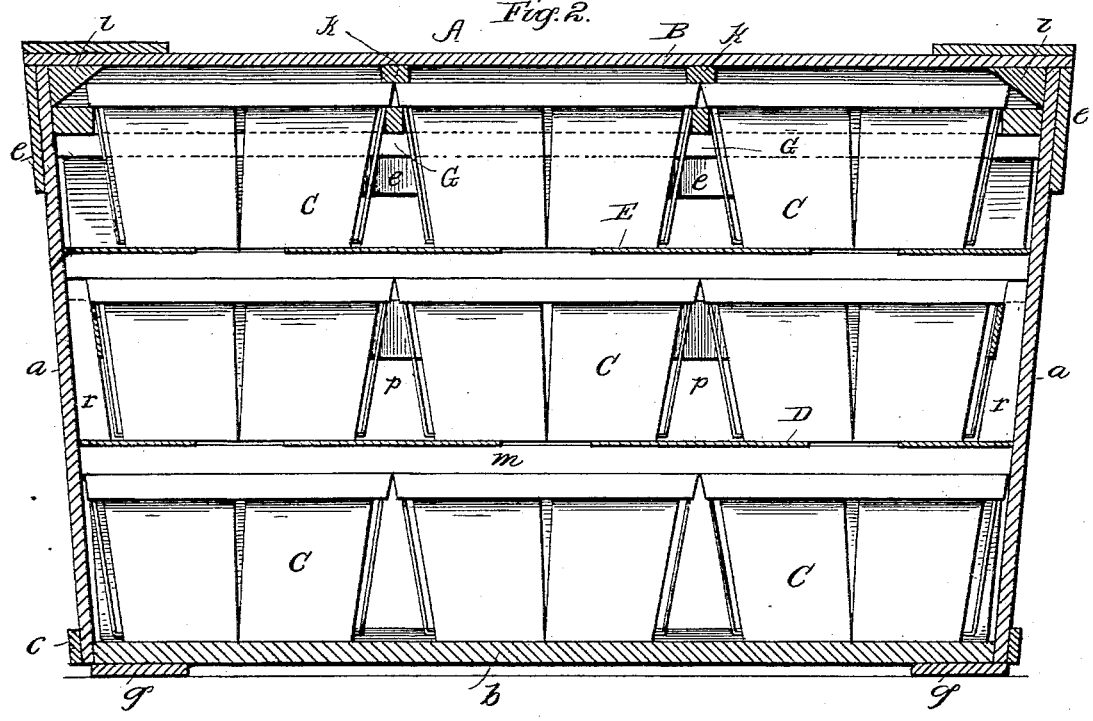

In the accompanying drawings forming a part of this specification—Figure 1 is a side elevation of my improved crate or carrier; Fig. 2 a central vertical longitudinal section of the same; Fig. 3 a vertical cross section through the crate; Fig. 4 perspective views of the different separating frames or partitions, and Fig. 5 a detail perspective view of a portion of the cover, reversed.

Similar letters refer to similar parts throughout all the views.

Referring to the drawings A represents a crate or carrier having its sides and ends formed of separated slats, $a$, arranged vertically, and secured at their lower ends to the bottom, $b$, of the crate by a binding strip, $c$, which is tacked to the bottom, $b$, through said slats and secured at the corners of the crate by copper or other metal clamps $d$, and at their upper ends the slats, $a$, are secured by means of wide strips $e$ which are tacked to said slats and the meeting ends of said strips $e$ are firmly held together by angles or corner irons $f$ as clearly shown in Fig. 1. Cleats, $g$, are secured to the bottom of the crate or carrier at each end so as to raise the same and permit a circulation of air beneath the crate or carrier.

The cover or lid, B, of the crate or carrier is hinged thereto by strap hinges, $h$, whose pivotal points are at or slightly above the top surface of the cover so that said cover may be turned completely over and hang parallel to the side of the crate or carrier, thus enabling the crates or carriers, when empty to be nested, one within the other, to save space in transportion. A hasp or hook $i$ is secured to the front edge of the cover and is adapted to be bent around the upper strip $e$ to secure the cover in place, an opening $j$ being formed in one of the vertical slats for this purpose or said slats may be arranged so as to leave a space between them at the proper point for the hasp or hook *i* to be passed between them and be bent about the strip *e*, if desired. The cover B is formed with the transverse strips or rails *k* on its under side arranged and located so as to bear, when the crate or carrier is filled with the tiers of boxes or baskets C and the cover is down or closed, on the meeting edges, at the top, of the central or middle boxes of the top tier and the adjacent boxes, as clearly shown in Fig. 2, while at each end the cover is provided with triangular shaped strips or rails *l*, the tapered surfaces or sides of which bear on and extend below the top edges of the end row of boxes or baskets of the top tier, so as to get a bearing on the outer vertical surface of the strips or rails against the ends of the crate or carrier.

From the above description it will be understood that the boxes or baskets, being arranged in tiers in the crate or carrier, will be held firmly down and the top tier against lateral movement or in their set positions by the cover, the strips *k* bearing on the top edges of said boxes in pairs, and the strips or rails *l* bearing on the outer top edges of the end boxes and extending below the same so as to prevent lateral movement of the boxes during transportation.

The sides and ends of the crate or carrier diverge toward the top and said crates or carriers are made of a size to hold any desired number of boxes or baskets, the crate shown being adapted to hold three tiers of six boxes or baskets each, and said boxes or baskets being also larger or of greater diameter at the top than at the bottom, the bottom tier of boxes will rest on the bottom of and accurately fit within the crate or carrier, the outer top edges of each box or basket resting against the sides and ends of the crate or carrier and their inner top edges bear against each other so that all lateral movement of the boxes or baskets forming the bottom tier is prevented. On the top of the bottom tier an ordinary separating-partition D is placed, the central rail, *m*, of which rests on the meeting edges of the tops of the bottom tier of boxes or baskets and on top of this partition, D, the second tier of boxes or baskets rest. As the boxes or baskets are all of the same size it it evident, that the tiers after the first or bottom tier will not fill the crate from side to side and end to end as do the bottom tier of boxes or baskets and I therefore provide a tier separating-partition E the side strips or rails *n* of which are formed triangular so as to partly rest on the tops of the boxes or baskets of the second tier and partly extend below the same, the outer or vertical surfaces of said rails fitting snugly against the side walls of the crate so as to wedge the boxes or baskets tightly in the crate. The partition E is also provided with a central strip or rail *o* of less thickness than rails *n* which rests on the meeting edges of each pair of boxes or baskets thus preventing the same tilting upward. At each side and each end of the second or middle tier of boxes or baskets I provide a frame F to brace and strengthen the bodies of the boxes and crates which acts also to prevent any shifting of the same during transportation. This frame consists of a slat or thin strip of wood, *p*, nailed firmly to the upper ends of any suitable number of uprights *r*, the inner faces or sides of which are inclined so as to conform to the shape of the boxes or crates, the slats being nailed to said inclined sides or faces and bearing against the bodies of the boxes or baskets at a suitable point below the tops thereof. The uprights *r* rest on the edges of the partition D and the end uprights of each frame are nailed to the slats in a sightly inclined position so as to conform to the shape of the sides and ends of the crate or carrier at the corners thereof.

G represents a pocket rack consisting of rails or strips nailed at right angles to each other to form openings or pockets to receive the boxes or baskets, the rack shown, Fig. 4, being intended to hold six boxes although it may be constructed to hold any desired number. The rack is shown in Figs. 1, 2 and 3 in connection with the top tier of boxes or baskets and serves to brace and separate each box or basket from the others comprising the said tier. The rack is first set or placed in the crate or tier and rests on the inner faces of the walls thereof and the boxes or baskets are then placed therein. It will, of course, be understood that the racks may be used for all the tiers of boxes or baskets of each crate or carrier, if desired, in which event they are made of different sizes to conform to the gradually decreasing diameter of said crates or carriers. With these racks used throughout the crate or carrier all liability of one tier of baskets or boxes, in case of the breaking of the separating partitions, on which it rests, settling down on the fruit or vegetables contained in the boxes or baskets forming the next tier, is obviated as said racks will support the boxes or baskets arranged therein in their proper position.

Having thus described my invention, what I claim as new, and desire to secure by Letters Patent, is—

1. In a crate or carrier, the combination, of a series of boxes or baskets arranged in tiers, and partitions for separating said tiers provided at each side with a triangular rail adapted to rest on the outer top edges of said boxes or baskets and to extend below said top edges and bear against the inner surface of the crate, substantially as shown and described.

2. In a crate or carrier, the combination, of a series of boxes or baskets arranged in tiers, and partitions for separating said tiers provided at each side with a triangular rail adapted to rest on the boxes or baskets at their outer top edges and to extend below said top edges and bear against the interior surface of the crate and with a central rail adapted to rest on the meeting edges of the series of boxes or baskets of each tier, substantially as described.

3. The combination, with the crate or carrier having a cover provided with triangular end rails and intermediate square rails, of a series of boxes or baskets arranged in tiers in said crate or carrier, means for separating the tiers horizontally, and means for separating each of the boxes or baskets forming each tier from the other boxes or baskets of each tier, substantially as described.

4. The combination, with a crate or carrier having a cover provided with triangular end rails and square intermediate rails, of a series of boxes or baskets arranged in tiers in said crate or carrier, partitions for separating such tiers horizontally, racks for separating the boxes or baskets of each tier, and frames, each comprising inclined uprights and inclined slats connecting said uprights arranged to bear against the outer sides of the outer boxes of each tier and against the inner surfaces of the crate to prevent lateral movement of the boxes or baskets, substantially as described.

In testimony whereof I affix my signature in presence of two witnesses.

JAMES EDWARD ROUTH.

Witnesses:
R. L. JUDKINS,
R. E. BRUNET.